Figure 3:
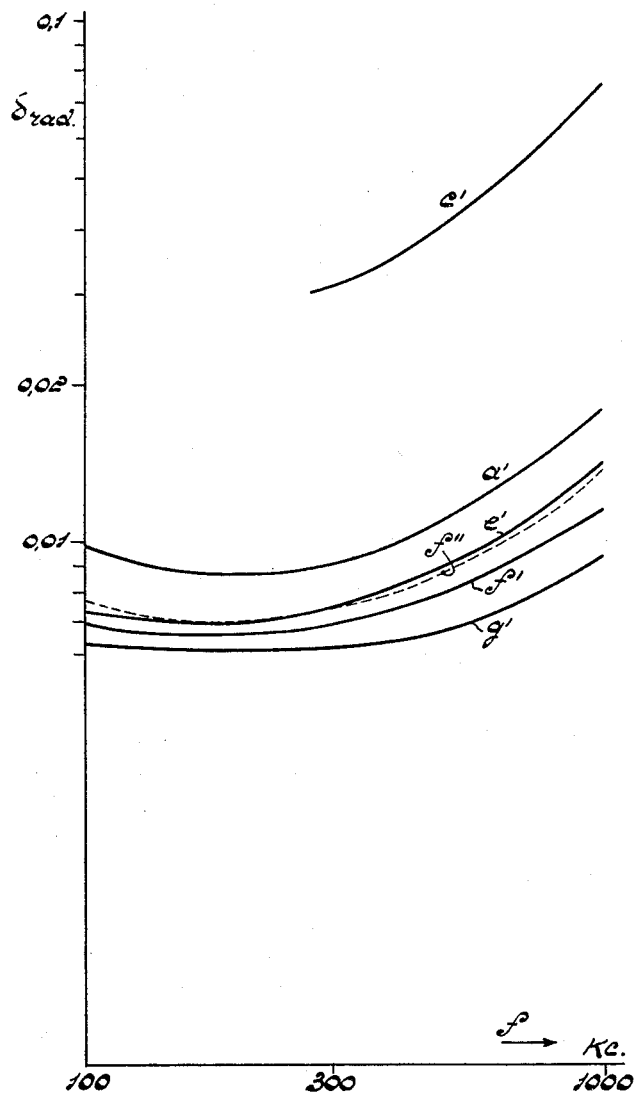

Jan. 10, 1956   J. J. WENT ET AL   2,730,681
INDUCTANCE
Filed April 18, 1951   2 Sheets-Sheet 1
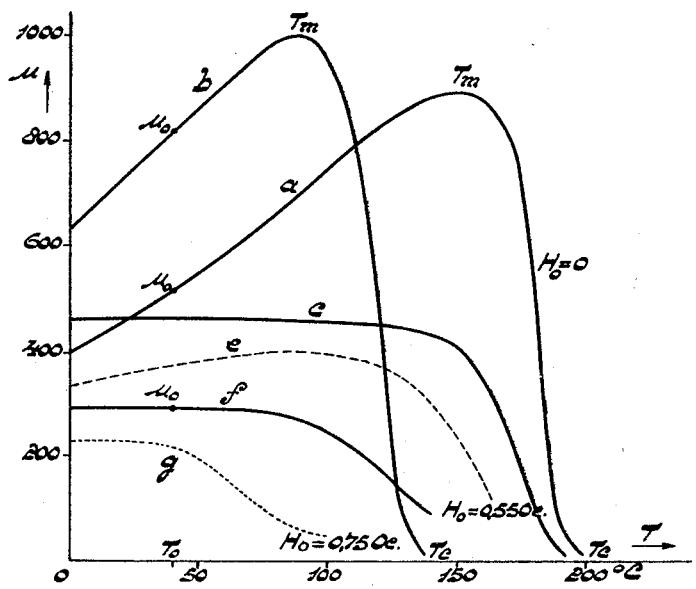
Fig.1
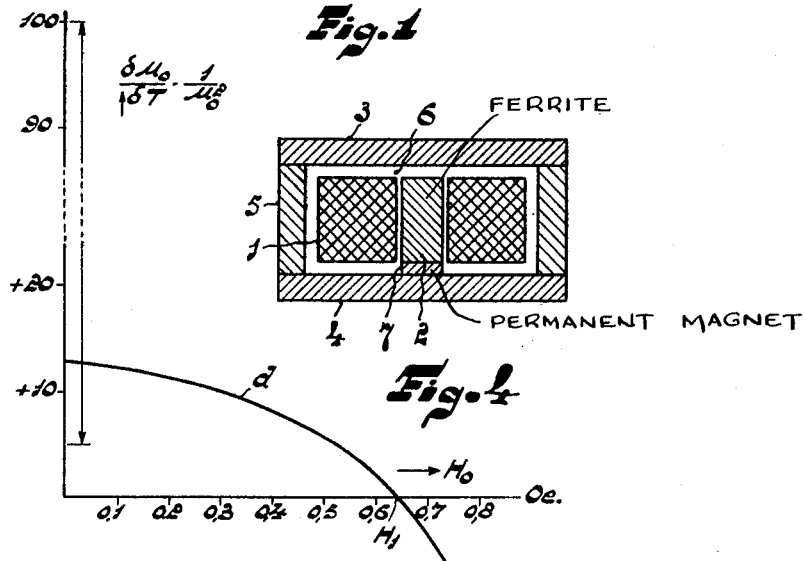
Fig.2
Fig.4
INVENTORS
JAN JACOBUS WENT
GOVERT JAN VERLINDE
BY
Fred M. Vogel
AGENT

INVENTORS
JAN JACOBUS WENT
GOVERT JAN VERLINDE

United States Patent Office 2,730,681
Patented Jan. 10, 1956

---

2,730,681

INDUCTANCE

Jan Jacobus Went, Eindhoven, and Govert Jan Verlinde, Hilversum, Netherlands, assignors to Hartford National Bank and Trust Company, Hartford, Conn., as trustee Application April 18, 1951, Serial No. 221,572

Claims priority, application Netherlands April 20, 1950

4 Claims. (Cl. 336—110)

The invention relates to an inductance adapted to operate at wave frequencies exceeding 10 kc. and having a ferro-magnetic core which is made of highly permeable ferrite, having a loss angle $\delta$ the tangent of which is less than 0.06 and the Curie-temperature of which exceeds 80° C.

In the manufacture of such core material, selected metal oxides in certain proportions are mixed and sintered under carefully controlled conditions to produce a ferrite material which comprises substantially homogeneous mixed crystals and unites a high permeability with low losses. The process of manufacturing such ferrite materials is more fully described in U. S. Patent 2,452,529, issued October 26, 1948.

It has been found that the permeability of such ferrite materials vary with temperature, it being possible to control the temperature $T_m$, at which the maximum permeability occurs, by a suitable choice and ratio of the constituent components such that this temperature approaches the operation temperature $T_0$, at which the core of the inductance is normally operated. This temperature $T_m$ is only slightly below the Curie-temperature $T_c$, the temperature at which the material becomes paramagnetic, so that above the temperature $T_m$, the permeability of the core material drops materially with temperature. However, also below this temperature $T_m$, the permeability varies greatly with temperature. Hence, at the operation temperature $T_0$, the inductance, which is a function of the permeability of core, also greatly varies with temperature. This variation in inductance is undesirable, since in practical applications temperature fluctuations of about 20° C. in the neighborhood of the operation temperature must be tolerated.

It is an object of the invention to provide an inductance coil having a ferro-magnetic core made of ferrite, in which the variations of the permeability due to temperature fluctuations are minimized.

According to the invention, variations of permeability with temperature in a core of ferrite material are overcome by means for producing a constant premagnetising field within the core material (the permeability of the core material thus decreasing to about half its value at most), this field being adjusted to a value at which the inductance of the coil is substantially independent of temperature. This premagnetising field may be produced, for example, by means of a permanent magnet arranged in the proximity of the coil whose magnetic axis is preferably at right angles to the direction of the magnetic alternating field produced within the coil by the alternating currents traversing the winding on the core.

The invention will now be described more fully with reference to the accompanying drawing in which Fig. 1 indicates the permeability $\mu$ as a function of the temperature T.

Fig. 2 indicates the variation $$\frac{\delta\mu_0}{\delta T}$$

of the permeability with temperature, measured and multiplied by $$\frac{1}{\mu_0^2}$$

at the operation temperature $T_0$ as a function of a premagnetising field $H_0$.

Fig. 3 indicates the loss angle $\delta$ as a function of the frequency $f$, and Fig. 4 shows one embodiment of a coil according to the invention.

Referring to Fig. 1, the curve $a$ indicates the permeability $\mu$ of a highly permeable form of ferrite having low losses, for example, a Ni-Zn ferrite having a composition in mole percent of 20.4% NiO, 30.6% ZnO, and 49% $Fe_2O_3$, as a function of the temperature T. At the Curie point $T_c$ the material becomes paramagnetic, so that at this point the permeability is equal to approximately 1. Slightly below the Curie temperature, for example at the temperature $T_m$, the material exhibits a maximum permeability. By varying the composition of the ferrite, these temperatures $T_c$ and $T_m$ can be caused to shift, so that it is possible to obtain, for example, a ferrite having a $\mu T$-characteristic curve similar to curve $b$ in Fig. 1, and these temperatures $T_m$ and $T_c$ for the curve $b$ are thus in closer proximity to the operation temperature $T_0$. However, in this case, it will be necessary to provide that the temperature $T_m$ exceeds the operation temperature $T_0$, since, if the operation temperature $T_0$ were coincident with the temperature $T_m$ (in which case the maximum permeability occurs), the material would exhibit excessive losses. The material would also exhibit the property that the permeability will generally vary with frequency at frequencies as low as below 500 kc. and would suddenly tend to drop down materially at a slightly higher operating temperature. Accordingly, as higher wave frequencies are to be applied to the coil, a core material with higher Curie temperature would have to be chosen.

At the temperature $T_0$ the permeability of the core material varies materially with temperature, as is apparent from the slopes of the curves $a$ and $b$ of Fig. 1 at the temperature $T_0$. In Fig. 2 an arrow indicates the range within which the temperature coefficient $$\frac{\delta\mu_0}{\delta T}$$

of various forms of ferrite with low losses varies.

In this case the vertical scale has been divided by $\mu_0^2$ ($\mu_0$ is the permeability at the operating temperature $T_0$) in order to obtain a correct comparison between the various forms of ferrite. It has therefore been found that it is ordinarily not possible to manufacture a ferrite with low losses and a zero temperature coefficient. In particular, nickel-zinc ferrites are found to have a high temperature coefficient. It is possible with the use of definite admixtures of two or more ferrites to produce a ferrite material whose permeability varies with temperature in accordance with the curve $c$ in Fig. 1, the temperature coefficient at the operation temperature $T_0$ being substantially equal to zero. But, while the losses of satisfactory materials have a value varying in accordance with the curve $a'$ as shown in Fig. 3, the loss curve of the material associated with the curve $c$ of Fig. 1 is found to vary in accordance with the curve $c'$, and hence to lie at a level slightly more than three times as high as the curve $a'$.

According to the invention this disadvantage can be overcome by means of a premagnetising field, which not only decreases the permeability of the core material, but also reduces the losses, so that the material still retains its satisfactory high-frequency properties.

A premagnetising field in an inductance has heretofore been used although in a different connection e. g., if an inductance coil is included in the anode circuit of an amplifying tube, a premagnetising field will be produced due to the direct anode current of the tube flowing through the coil. However, in this case, such a circuit arrangement is proportioned so that the permeability of the core material is slightly reduced in amounts of only about one percent.

A similar condition is found in circuit arrangements employed for frequency-modulation purposes wherein the inductance of an oscillatory circuit is varied in accordance with a modulating oscillation by premagnetising the core material of the inductance in accordance with this modulating oscillation. Again, in this case, a variable premagnetising field is used which is much stronger, since in this case the permeability is decreased to a considerably greater extent than with the present inductance.

Found in succession with an increasing degree of premagnetisation were the $\mu T$-curves $e$, $f$ and $g$ of Fig. 1 and the $\delta f$-curves of $e'$, $f'$ and $g'$ of Fig. 3 for the Ni-Zn ferrite disclosed earlier. In Fig. 2 the curve $d$ indicates the variation of the temperature coefficient for that ferrite as a function of the premagnetising field $H_0$. The values of the field $H_0$ indicated in the figures refer to the premagnetising field strength produced within the material. At the value $H_1$ (0.65 Oersteds), at which the curve $d$ intersects the $H_0$ axis, the variation of the permeability with temperature is equal to zero and corresponding with this value $H_1$ of the premagnetising field are the curves $f$ of Fig. 1 and $f'$ of Fig. 3.

The form of the curve $f$ of Fig. 1 shows that the temperature coefficient of the permeability is substantially equal to zero over a wide range. Though due to this premagnetising field, the permeability has decreased to about half its value, according to the curve $f'$ of Fig. 3, the losses have also dropped to about half their value. For example, in Fig. 1 it will be observed that the permeability of the curve $a$ at $T_0$ is about 500 (this is actually the initial permeability since no biasing field is present, i. e., $H_0=0$); for curve $f$, however, the permeability at $T_0$ is about 300 (that is, the permeability at the bias condition $H_0=0.65$ Oersteds). Hence, the permeability of the core with the premagnetizing field is about one-half the initial permeability of the core. The core has thus retained its satisfactory high-frequency properties, while at the same time the permeability does not vary, even with considerable temperature variations.

The loss curves of Fig. 3 are plotted with a premagnetising field which is at right angles to the alternating field of the applied wave. In addition, the losses are slightly lower than if the premagnetising field were chosen to be parallel to the field of the applied wave, as may be seen from the loss curve $f''$ which is measured with a premagnetising field producing the same reduction of permeability. It is obvious that the alternating field produced by the applied wave must remain small with respect to the premagnetising field.

The results shown by the curve $d$ in Fig. 2 are generally applicable to all ferrites; that is to say, for each ferrite exhibiting a positive $$\frac{d\mu}{dT}$$

characteristic; there will exist a premagnetizing field at which $$\frac{d\mu}{dT}$$

will be zero. The specific value of the field strength will, of course, depend on the composition and processing conditions of the ferrite core, and can be determined by simply locating a few points on the curve $d$ of Fig. 2 by simple experimentation, and then interpolating, or extrapolating as the case may be, the strength at which the curve intercepts the abscissa.

The method above also permits the manufacture of a ferrite material having a magnetic permeability with a negative temperature coefficient. This material may be used in conjunction with a core material having a positive temperature coefficient, so that the resultant inductance coil has an inductance value which is substantially constant with temperature.

In this method, however, the losses of the core material have been found to tend to increase at definite frequencies of the applied wave. These losses are due to mechanical resonances of the core material acted upon by the premagnetising field. By a suitable choice of the dimensions of the core they can be shifted to frequencies falling outside the range of frequencies of the applied wave.

Referring to Fig. 4, an inductance coil according to the invention is illustrated and comprises a coil winding 1, a ferro-magnetic core 2 and a ferro-magnetic shell comprising two sheets 3 and 4 and a ring 5. The core 2 and the sheets 3 and 4 are separated by air gaps 6 and 7, which determine the effective permeability of the core material. A coil of such type is well known per se.

In order to provide a constant premagnetising field within the core which is adjusted to a value at which the inductance of the coil is substantially independent of temperature, a body of substantially non-conductive permanent ferro-magnetic material of high coercive force and magnetised along an axis at right angles to the circumscribing surface of the air gap is positioned in the air gap. The air gap 7 may be filled with this material wholly or in part. However, due to the low permeability of this material, it retains the property of an air-gap.

Satisfactory materials for this purpose are ferro-magnetic magneto-plumbites having a coercive force of at least 700 Oersted. These magneto-plumbites are composed of single crystals and/or mixed crystals of magneto-plumbite structure of compounds, $MeO.6Fe_2O_3$, where Me is a metal selected from the group consisting of Pb, Ba, Sr. These materials are satisfactory insulators so that eddy-current losses are not introduced into the inductance coil in contradistinction to the usual permanent magnetic materials. In addition these materials have a high coercive force so that, even if they are arranged in the form of a thin small sheet 7 and magnetised along an axis which is at right angles to the circumscribing surface of the airgap 6, it retains its remanent magnetism in spite of the de-magnetising field which results when such a small sheet is used. An example of a typical magnet of this type has the composition $SrFe_{12}O_{19}$, and a remanence of 1845 Gauss, and a coercive force of 970 Oersted.

The term "ferrite material" as referred to herein in the specification includes the specific ferrites referred to therein as well as those known to the art as exemplified in U. S. Patents 2,452,529, 2,452,530 and 2,452,531. Whenever the term "permeability" is used in either the specification or the claims, it refers to the initial permeability of the core material, i. e., the value of the permeability of the core at a particular bias condition in the absence of A. C. signal frequencies through the surrounding coil.

While the invention has thus been described with specific examples and in specific embodiments thereof, other modifications will be readily apparent to those skilled in the art without departing from the spirit and scope of the invention as defined in the appended claims.

What we claim is:

1. An inductor adapted to operate at signal frequencies exceeding 10 kc. comprising a ferromagnetic core element constituted of a ferromagnetic ferrite material having a large magnetic permeability, a coefficient of losses tan δ less than 0.06, and a Curie temperature exceeding 80° C., a winding surrounding said core element, and a permanent magnet in close proximity to said core element and coupled thereto at a position at which a constant premagnetizing field is produced within the core element by said magnet, said constant field produced by said magnet having a value at which the initial permeability of said core element is reduced to about one-half the value that would exist in the absence of the premagnetizing field whereby the inductance of the inductor is substantially independent of temperature over a range of temperatures.

2. An inductor adapted to operate at signal frequencies exceeding 10 kc. comprising a ferromagnetic core element constituted of a ferromagnetic ferrite material having a large magnetic permeability, a coefficient of losses tan $\delta$ less than 0.06, and a Curie temperature exceeding 80° C., a shell of said ferrite material surrounding said core element and spaced therefrom, a winding surrounding said core element, and a permanent magnet positioned in an air-gap between the core element and the shell and producing a constant premagnetizing field within the core element, said magnet comprising a body of substantially non-conductive material having a relatively high coercive force and a magnetic axis substantially perpendicular to the surface of the core element providing the air-gap, said constant field having a value at which the initial permeability of said core element is reduced to about one-half the value that would exist in the absence of the premagnetizing field whereby the inductance of the inductor is substantially independent of temperature over a range of temperatures.

3. An inductor as set forth in claim 2 wherein the permanent magnet material consists of ferromagnetic magnetoplumbite composition of the formula $$MeO.6Fe_2O_3$$

where Me is a metal selected from the group consisting of Pb, Ba and Sr.

4. An inductor as set forth in claim 3 wherein the ferrite material consists of Ni–Zn ferrite.

References Cited in the file of this patent

UNITED STATES PATENTS

| 720,884 | Burgess et al. | Feb. 17, 1903 |
| 2,059,393 | Polydoroff | Nov. 3, 1936 |
| 2,169,866 | Bedford | Aug. 15, 1939 |
| 2,380,242 | Jewell | July 10, 1945 |
| 2,509,210 | Clark | May 30, 1950 |